Oct. 9, 1928.  
J. N. PARKER  
TRACTOR PLOW  
Filed May 3, 1920  
1,686,983  
2 Sheets-Sheet 1
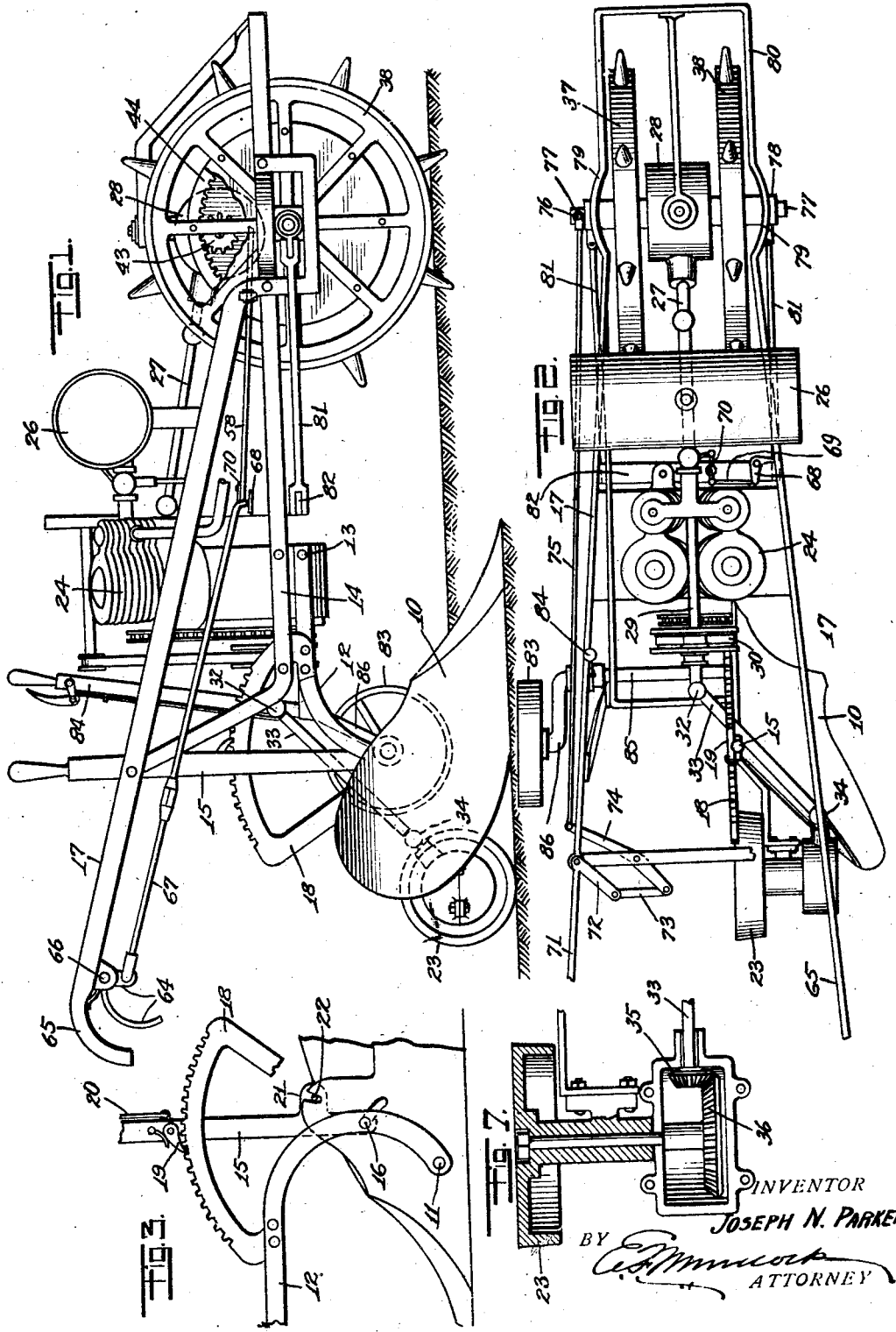
INVENTOR  
JOSEPH N. PARKER  
BY  
ATTORNEY

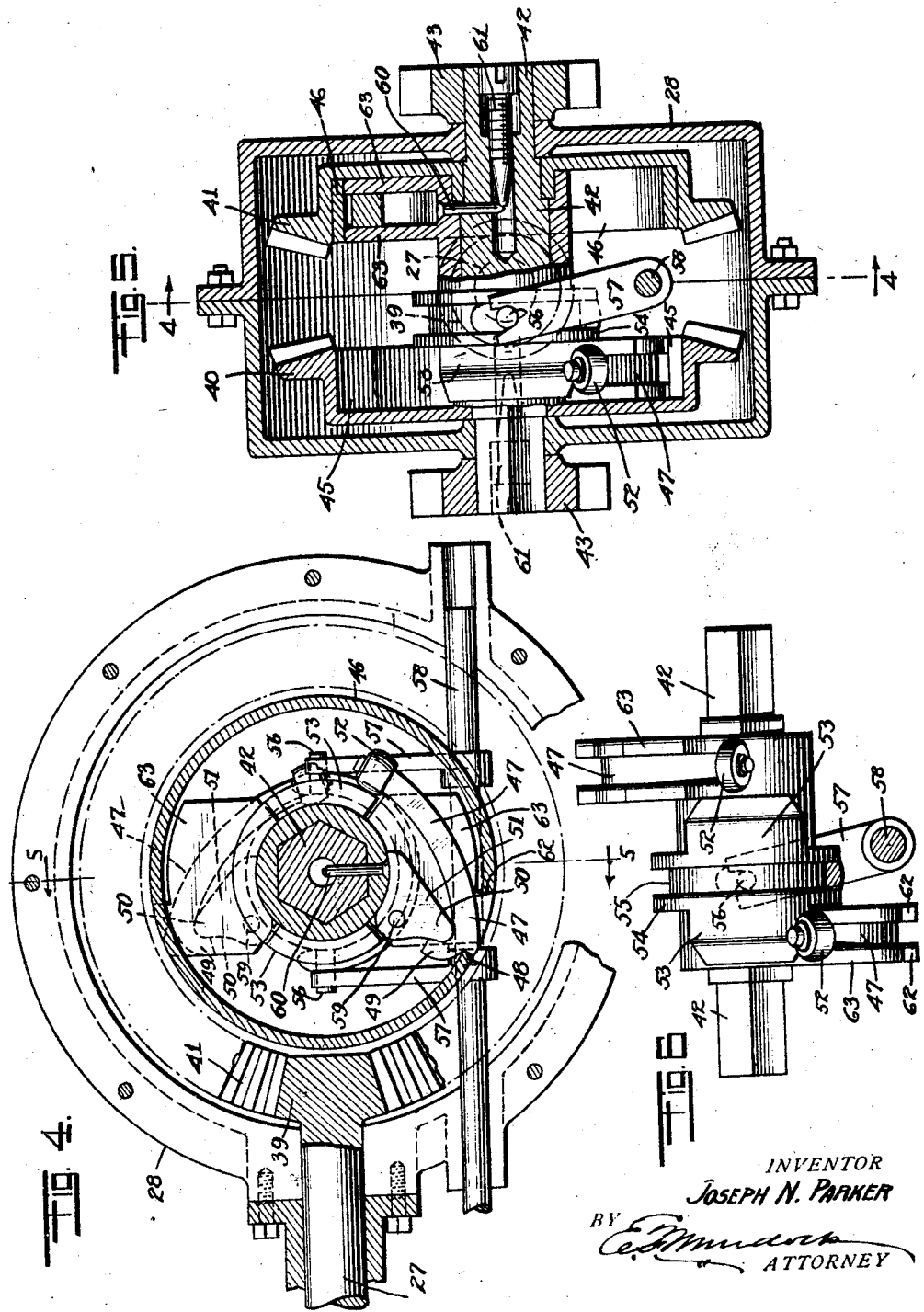

Patented Oct. 9, 1928.

1,686,983

UNITED STATES PATENT OFFICE.

JOSEPH N. PARKER, OF BEDFORD CITY, VIRGINIA.

TRACTOR PLOW.

Application filed May 3, 1920. Serial No. 378,563.

Among the principal objects which the present invention has in view are: To provide a power traction for a plow, having a walking frame and manual controls associated therewith for operating the engine and steering the tractor; to provide means accessible to the operator of the plow for varying the working position of the plow share; to permit the land side to add to the tractor force of the implement; and to provide a simplified means for starting and reversing the traction impulse of the motor in the traction wheels.

*Drawings.*

Figure 1 is a side view of a walking plow constructed and arranged in accordance with the present invention;

Figure 2 is a top plan view of the same;

Figure 3 is a detail view showing fragments of the plow, the brake beam and means for varying the working angle of the plow;

Figure 4 is a vertical, longitudinal section on an enlarged scale of the transmission mechanism, the section being taken as on the line 4—4 in Figure 5;

Figure 5 is a cross section of the same on reduced scale, the section being taken as on the line 5—5 in Figure 4;

Figure 6 is a detail view of the main shaft of the transmission mechanism; and

Figure 7 is a detail view on enlarged scale showing in section the land side tractor wheel with which this plow is provided, and a fragment of the transmission mechanism for driving same.

As seen in the drawings, the plow share 10 is pivotally connected by the bolt 11 to the beam 12. The beam 12 is rigidly connected by a bolt 13 to the tractor frame 14 in which the prime mover of the tractor and the wheels thereof are mounted. The purpose of the novel mounting described is to permit the digging angle of the plow share to be changed at will by the operator. To this end a hand lever 15 is pivotally connected on the bolt 16, and extends above the hand bars 17, and between the same to place the hand grip of the said lever within easy access of the attendant.

A quadrant 18 is mounted on the beam 12, as shown best in Figure 3 of the drawings, and is furnished with teeth to receive the pawl 19 when the same is permitted to engage the teeth of the quadrant. The pawl 19 is spring-seated, and is operated by means of a thrust rod 20 associated with the above-mentioned hand grip, so that the operator can readily release said pawl or permit it to re-engage the teeth of the quadrant 18. An extension 21, operatively unites the lever 15 and the structural frame of the plow, being connected by preference to the land side plate by means of the pin 22, which rests in a groove provided therefor in the said land side plate.

The frame 14 is dropped from the hand bars 17, and supports the engine 24, and the crank case thereof. The engine 24 is of any approved type. The gasoline for the consumption thereof is supplied from the gasoline tank 26. The engine has a propeller shaft 27, one end of which, as seen best in Figure 4 of the drawings, has a bearing in the transmission casing 28. An auxiliary shaft 29 is driven by a belt 30 from the fan pulley or other device at the upper extension of the motor, which is, as shown in the drawings, preferably covered by a hood. The crank shaft of the engine has a clutch and is connected by a universal joint 32 with a transmission shaft 33. The shaft 33 is connected by a second universal joint 34 with a miter wheel 35. The wheel 35 is meshed with a bevel wheel 36, on the shaft of the land side wheel 23.

In this manner traction effects are produced simultaneously, in the land side wheel 23 and in the tractor wheels 37 and 38. The rotation which is imparted to the wheels 37, 38, is transmitted through the shaft 29 within the casing 28. The pinion 39 operatively engages miter gear wheels 40 and 41, both of which are loosely mounted in bearings formed on the shaft 42. At the outer extremities of the shaft 42 are pinions 43. The pinions 43 extend from opposite sides of the casing 28, and engage the internally cut teeth of the large wheels 44. The pinions 43, the wheel disks 44 and the traction wheels 37, 38, revolve in correspondence with the operative engagement by the pinion 39 with the gear wheels 40 and 41. The selection of this engagement is the function of the brake mechanisms shown in Figures 4 to 6 inclusive.

The brake bands 45 and 46 are expanded by the operation of the levers 47 disposed beneath the bands as shown in Figure 5, the heel 48 of each of which bears against the end of one of the brake bands. The lever 47 has a toe 49, which rocks on the shoulder 50 of a bearing plate 51. The levers 47 are each provided with a roller 52, the office of which is to override and be wedged upward by the wedge plates 53. The plates 53 are oppositely extended from a sliding collar 54. The collar 54 is furnished with a groove 55, into which extends pins 56, on the arms 57, which extend from and are swung by the rocking of the shaft 58.

It is obvious that as the shaft 58 is rocked one way or the opposite, the plates 53 extend below the rollers 52, and lift the ends of the levers 47 associated therewith to the end that the brake bands 45 are alternately released on the one side, and engaged on the other by the wheels 40, 41.

In correspondence with the engagement of the said wheels by the brake that wheel drives the shaft 42 and the pinions 43 associated therewith. As the wheels 40 and 41 are engaged with the pinion 39, at opposite sides thereof, the rotation of the said wheels is relatively in opposite directions. Therefore, if the shaft 58 be rocked to cause one of the wheels 40, 41 to rotate the shaft 42, the wheels 37, 38, are rotated progressively, to carry the plow in a forward direction, while if the opposite wheel 40, 41 is engaged, the wheels 37, 38 are retractively or reversely rotated, with the result that the plow is backed up into position. If the shaft 57 is so disposed that neither plate 53 engages either of the levers 47, the pinion 39 rotates the wheels 40, 41, without effect upon the tractor wheels 37, 38.

It is obvious that as the wheels 52, the brake bands 45, or plates 53 wear, the parts should be adjusted. To this end the bearing plates 51 are each pivoted by means of pins 59 to be rocked thereon whenever the adjusting pins 60 are thrust outward under the toes of the said bearing plates 51. As seen best in Figure 5 of the drawings, the pins 60 are lifted, by means of tapering screws 61. The screws 61 engage the threads in the tapped hole formed in the shaft 42 from both ends thereof.

It is obvious that as the screws 61 are driven into the shaft 42, the tapered ends of the screws 61 pass under and elevate the pins 60, which rock the plates 51 so as to expand the bands 45, 46, by pressing backward the heels 48 of the levers 47. The opposite ends of each band is held by the shoulder 62 on the extensions 63, wherein are disposed the levers 47. In this way the wear above referred to is compensated for.

To rock the shaft 58 the hand lever 64 is retracted or extended. The lever 64 is mounted adjacent the hand hold 65 on one of the hand bars 17. The lever 64 is pivoted on the pin 66, and is connected by means of the tie rods 67 with a bell crank 68. As seen best in Figure 2, the bell crank 68 is operatively connected, by means of a link rod 69, with a rocking lever 70, which engages a pendant arm on the shaft 58. By means of this arrangement the shaft 58 is rocked to shift the collar 54 to one side or the other of the median plane, so that one or other of the extensions 53 is extended below one or other of the wheels 52, with the effect that the brake band 45 or 46 corresponding with the movement of the lever 64 is set to drive the shaft 42 through one or other of the wheels 40 or 41. As the wheels 40 or 41 engage the pinion 39 at opposite sides, they have imparted to them opposite rotary directions, which, in turn, imparts to the shaft 42 and the pinions 43 connected therewith, successive opposite rotations by means of which the tractor wheels 37 and 38 are diven forwardly or rearwardly.

It is obvious that if the shaft 58 be moved to a position where the plates 53 are neither extended under the wheels 52, the wheels 37 and 38 remain stationery, or in what may be termed neutral position.

The wheels 37, 38, are used for steering the plow, and to this end the handle 71 has an extension 72, which is operatively connected, by means of a link 73, and a rocking lever 74, with the tie rod 75. The rod 75 is pivotally connected by means of a yoke 76 with the axle 77, on which the wheels 37, 38 are mounted. The axle 77 has bearings in a sliding block 78, which tracks in a slot formed in the outrigger extension 79 of the the frame 80. The blocks 78 are connected by means of the tie rods 81 with a parallel bar 82 disposed beneath the frame, which maintains the alignment of the wheels 37, 38. The plow is leveled by the wheel 83, which is pivotally mounted at the end of a lever 84. The lever 84 is hand operated, and, in accordance with the throw thereof, the wheel 83 is raised or lowered, in relation to the shaft 85, with which the crank arm 86 is integrally connected. At the end of the crank arm 86 is a bearing for the wheel 83.

Claims:

1. A tractor plow as characterized comprising a plurality of tractor wheels; a frame; means pivotally connecting said wheels and said frame; manually actuated means for pivoting said wheels; a prime mover mounted on said frame; a transmission mechanism operatively connecting said wheels and said prime mover, said mechanism embodying a rotary driving member and two rotary driven members constantly engaged with said driving member, said driven members being loosely mounted on the driving shaft of said transmission mechanism; and means manually operated for operatively connecting said driven members successively with said shaft, said means embodying a plurality of expansion bands, each operatively disposed in one of said driven members, both of said bands being operatively associated with the driving shaft of said transmission mechanism; a shifting wedge adapted for insertion below said bands to expand the same; and power devices intermediate said bands and said shifting device for multiplying the power applied in setting said bands.

2. A tractor plow as characterized comprising a plurality of tractor wheels; a frame means pivotally connecting said wheels and said frame; manually actuated means for pivoting said wheels; a prime mover mounted on said frame; a transmission mechanism operatively connecting said wheels and said prime mover, said mechanism embodying a rotary driving member and two rotary driven members constantly engaged with said driving member, said driven members being loosely mounted on the driving shaft of said transmission mechanism; and means manually operated for operatively connecting said driven members successively with said shaft, said means embodying a plurality of brake bands, each operatively disposed in one of said driven members, both of said bands being operatively associated with the driving shaft of said transmission mechanism; a shifting wedge adapted for insertion below said bands to expand the same; levers intermediate said bands and said shifting device for multiplying the power applied in setting said bands; and means for varying the operative position of said levers.

3. A tractor plow as characterized comprising a plurality of tractor wheels; a frame; means pivotally connecting said wheels and said frame; manually actuated means for pivoting said wheels; a prime mover mounted on said frame; a transmission mechanism operatively connecting said wheels and said prime mover, said mechanism embodying a rotary driving member and two rotary driven members constantly engaged with said driving member, said driven members being loosely mounted on the driving shaft of said transmission mechanism; and means manually operated for operatively connecting said driven members successively with said shaft, said means embodying a plurality of expansion friction members, each operatively disposed in one of said driven members, both of said friction members operatively associated with the driving shaft of said transmission mechanism; a shifting wedge adapted for insertion below said friction members to expand the same; levers intermediate said friction members and said shifting device for multiplying the power applied in setting said friction members; and means for varying the operative position of said levers, said means embodying rocking fulcrums for said levers, said fulcrums forming a pivotal connection for said levers adjacent the free ends of said friction members.

4. A tractor plow as characterized comprising a plurality of tractor wheels; a frame; means pivotally connecting said wheels and said frame; manually actuated means for pivoting said wheels; a prime mover mounted on said frame; a transmission mechanism operatively connecting said wheels and said prime mover, said mechanism embodying a rotary driving member and two rotary driven members constantly engaged with said driving member, said driven members being loosely mounted on the driving shaft of said transmission mechanism; and means manually operated for operatively connecting said driven members successively with said shaft, said means embodying a plurality of expansible friction bands, each operatively disposed in one of said driven members, both of said bands being operatively associated with the driving shaft of said transmission mechanism; a shifting wedge adapted for insertion below said bands to expand the same; and power levers intermediate said bands and said shifting device for multiplying the power applied in setting said bands; and means for varying the operative position of said levers, said means embodying rocking fulcrums for said levers, said fulcrums forming a pivotal connection for said levers adjacent the free ends of said bands; said means embodying supporting screws operable from the ends of said driving shaft for varying the initial disposition of said rocking levers.

JOSEPH N. PARKER.